United States Patent
van Berkel et al.

(10) Patent No.: US 11,305,910 B2
(45) Date of Patent: Apr. 19, 2022

(54) MULTILAYER CONTAINER COMPRISING A POLYETHYLENE FURANOATE LAYER

(71) Applicant: Synvina C.V., Amsterdam (NL)

(72) Inventors: Jesper Gabriël van Berkel, Amsterdam (NL); Jeffrey John Kolstad, Amsterdam (NL)

(73) Assignee: Furanix Technologies B.V., Amsterdam (NL)

( * ) Notice: Subject to any disclaimer, the term of this patent is extended or adjusted under 35 U.S.C. 154(b) by 99 days.

(21) Appl. No.: 16/807,711

(22) Filed: Mar. 3, 2020

(65) Prior Publication Data

US 2020/0283587 A1    Sep. 10, 2020

(30) Foreign Application Priority Data

Mar. 5, 2019 (NL) .................................. 2022678

(51) Int. Cl.

| | | |
|---|---|---|
| *B65D 1/02* | (2006.01) | |
| *B32B 1/02* | (2006.01) | |
| *B32B 27/26* | (2006.01) | |
| *B29C 49/00* | (2006.01) | |
| *B29C 49/08* | (2006.01) | |
| *C08J 5/00* | (2006.01) | |
| *B32B 27/36* | (2006.01) | |
| *B29K 67/00* | (2006.01) | |
| *B29L 31/00* | (2006.01) | |

(52) U.S. Cl.
CPC ........ *B65D 1/0215* (2013.01); *B29C 49/0005* (2013.01); *B29C 49/08* (2013.01); *B32B 1/02* (2013.01); *B32B 27/36* (2013.01); *C08J 5/00* (2013.01); *B29B 2911/14146* (2013.01); *B29K 2067/003* (2013.01); *B29L 2031/7158* (2013.01); *C08J 2367/02* (2013.01)

(58) Field of Classification Search
CPC .. B32B 1/02; B32B 27/36; B65D 1/02; B65D 1/0207; B65D 1/0215
See application file for complete search history.

(56) References Cited

U.S. PATENT DOCUMENTS

| | | | |
|---|---|---|---|
| 2014/0336349 A1* | 11/2014 | Sipos ................... | C08G 63/866 528/285 |
| 2016/0376400 A1* | 12/2016 | Moffitt ................. | B65D 1/0215 426/106 |
| 2018/0022866 A1* | 1/2018 | Moffitt .................... | B32B 27/08 426/127 |

FOREIGN PATENT DOCUMENTS

| | | |
|---|---|---|
| JP | 2018-199258 A | 12/2018 |
| WO | 2013/149221 A1 | 10/2013 |
| WO | 2015/031907 A1 | 3/2015 |
| WO | 2015/137805 A1 | 9/2015 |
| WO | 2016/130748 A1 | 8/2016 |
| WO | 2018/097728 A1 | 5/2018 |

OTHER PUBLICATIONS

Netherlands Search Report, Application No. 2022678, dated Nov. 27, 2019, 10 pages.

* cited by examiner

*Primary Examiner* — Walter Aughenbaugh
(74) *Attorney, Agent, or Firm* — Hoffmann & Baron, LLP

(57) ABSTRACT

A container includes an outer layer defining an exterior surface and including poly (ethylene terephthalate) and an inner barrier layer including semi-crystalline poly(ethylene furanoate) including semi-crystalline poly(ethylene furanoate) where the poly(ethylene furanoate) has a crystallinity $X_c$ of 3 to 40%.

9 Claims, No Drawings

MULTILAYER CONTAINER COMPRISING A POLYETHYLENE FURANOATE LAYER

CROSS-REFERENCE TO RELATED APPLICATIONS

This application claims the benefit of Netherlands Application No. 2022678, filed Mar. 5, 2019, the contents of which is incorporated by reference herein.

FIELD OF THE INVENTION

The invention relates to a container comprising a layer of poly(ethylene terephthalate) (PET) and a layer of poly(ethylene furanoate) (PEF), a preform for such a container and a method for producing such a container.

BACKGROUND OF THE INVENTION

Poly(ethylene terephthalate) (PET) is one of the most widely applied materials in plastic containers or bottles, due to its excellent barrier and mechanical properties. However, the barrier and mechanical properties are still limited for some applications, such as carbonated soft drink bottles with a volume lower than 1 L and for packaging oxygen sensitive products.

A widely applied solution to this problem is the use of a second material as an intermediate layer in the bottle wall. Many methods for injection molding exist that incorporate a middle layer in a preform, which ends up as a thin layer in the wall of the bottle after the bottle has been blown from such a preform. The most common material used as an additional layer today is a polyamide, such as nylon-6, nylon-6,6 or nylon MXD 6, that is derived from adipic acid and m-diaminomethylbenzene. Other, less common materials are polyethylene naphthalate (PEN) and polytrimethylene naphthalate (PTN). Typically the material of the additional layer comprises 5-20% wt of the total multilayer package dependent on the barrier improvement needed in the final package.

Typical known barrier materials are expensive; MXD6 and PEN are three and five times more expensive than PET, respectively. PTN is even higher in price. The known barrier materials also pose a threat for the PET recycling stream, because of too different processing temperatures and/or discoloration and/or haze in bottle walls in the recycled materials. Air elutriation and flake sorting steps are needed in recycling, creating more waste for the recyclers. Problems in recycling require limited use of tie-layers between the barrier layer and the PET layers. Therefore multilayer PET bottles tend to have poor adhesion between the layers, resulting in a squeaking sound and layer separation when handling the bottle. In some cases the amount of the barrier layer which may be used is further limited, below what a bottle designer may wish for obtaining improved barrier properties, due to incompatibility with the recycle process used to reclaim the PET main body. Furthermore, MXD6 does not yield any improvement for water vapour barrier.

In WO 2016/130748 a multilayer container with a barrier layer of PEF, or other furandicarboxylate polyesters or copolyesters, is described. Furandicarboxylate polyester can be used as a barrier material in multilayer bottles due to its good barrier properties, and such barrier properties extend across a number of the furandicarboxylate polyesters or copolyesters. According to WO 2016/130748 the furandicarboxylate polyester is a good barrier material as the $CO_2$ barrier properties of PEF are about 7 times better than that of semicrystalline PET and the $O_2$ barrier properties of PEF are about 5.2 times better than those of semicrystalline PET. WO 2015/031907 teaches that conventional methods for processing PET cannot be successfully applied to PEF in the production of containers, such as food and beverage containers. WO 2015/031907 therefore provides novel preforms and methods for processing polymers comprising FDCA to produce such preforms and containers by stretch blow molding.

In this context WO 2016/130748 discloses a multilayer container, comprising an outer layer defining an exterior surface and an inner layer defining an interior surface and interior space, wherein the outer layer comprises a PET polyester, and the inner layer comprises a 2,5-furandicarboxylate polyester, e.g., PEF. Although reference is made to semi-crystalline PET it appears that amorphous PEF is used in the containers shown in WO 2016/130748.

SUMMARY OF THE INVENTION

It is an object of the invention to further improve PET-containers comprising barrier materials, and especially those containing furandicarboxylate polyester. It is a further object of the invention to improve PET-containers comprising PEF. This is achieved according to a first aspect of the invention by a container comprising an outer layer defining an exterior surface and comprising poly(ethylene terephthalate) and an inner barrier layer comprising semi-crystalline poly(ethylene furanoate). Poly(ethylene furanoate) is also known as poly(ethylene-2,5-furandicarboxylate).

DETAILED DESCRIPTION OF THE INVENTION

The invention is based on the recognition that the use of semi-crystalline poly(ethylene furanoate) instead of amorphous poly(ethylene furanoate) not only further improves the barrier properties of poly(ethylene furanoate) but also allows for thinner barrier layers, which leads to a reduced PEF-content and thus easier recycling and also a reduced effect on the color of the resulting recyclate. With a reduced barrier thickness also multilayer containers can be produced as colourless and haze-free containers. Additionally the invention includes the recognition that with a semicrystalline barrier layer comprising poly(ethylene furanoate) the shelf life of the container is improved. Furthermore PEF has the advantage that it has barrier properties which are relatively independent of moisture, in contrast to for example nylon MXD6, allowing a more consistent performance independent of environment. The advantages of the invention further include the recognition that use of semi-crystalline barrier layer of PEF avoids the negative impact on PET recyclability which certain other barrier materials exhibit, because PEF can be processed at similar conditions as PET and has the ability to form a miscible system, resulting in haze-free materials in the recycle stream. The recycle system is further improved, as the crystallinity of the PEF layer makes subsequent additional crystallization, drying, and any solid-state polymerization (if desired) to be less burdensome.

The barrier improvement factor (BIF) of amorphous PEF and semi-crystalline PEF versus semi-crystalline PET is shown in Table 1. These factors can be found in bottles and films. The BIF is defined as the permeability of a gas through the film or piece of bottle wall, divided by the permeability of the gas through a film or bottle wall of semi-crystalline PET at the same temperature and pressure.

TABLE 1

Barrier Improvement Factor (BIF): comparison of BIF of amorphous and semi-crystalline PEF vs. BIF of semi-crystalline PET

|  | Amorphous PEF | Semi-crystalline PEF |
|---|---|---|
| $O_2$ | 2-6 | 8-10 |
| $CO_2$ | 4-7 | 8-11 |
| $H_2O$ | 1.2 | 2-3 |

As WO 2016/130748 describes a BIF for PEF of 7.9 for $CO_2$ and a BIF of 5.2 for $O_2$ it is evident that WO 2016/130748 relates to amorphous PEF.

In the following, embodiments of the invention are described. The embodiments described herein can be combined if not explicitly described as alternatives.

In a preferred embodiment the poly(ethylene furanoate) has a crystallinity $X_c$ of at least 5%. In an even more preferred embodiment the poly(ethylene furanoate) has a crystallinity $X_c$ of 15 to 40%. The higher the crystallinity is the greater is the improvement in the barrier improvement factor over PET and the shelf life. The crystallinity is preferably measured via differential scanning calorimetry (DSC) and given as %, where the % crystallinity is calculated on the first upheat of the sample, and the net melting enthalpy is divided by the enthalpy of 140 J/g, which represents a 100% PEF crystallinity, and then multiplied by 100:

$$\text{Crystallinity } X_c = \frac{\Delta H_{melt(net)}}{\Delta H^O_{melt}} \quad \text{(Equation I)}$$

with $\Delta H_{melt}$ (net) being the net melting enthalpy measured at the first upheat of the sample and $\Delta H°_{melt}$ the equilibrium melting enthalpy taken at 140 J g$^{-1}$ for PEF.

Preferably, the following method is employed. The barrier layer is carefully removed from the bottle side-wall panel where the bottle diameter is the largest, and circles with a 5 mm radius are cut therefrom and placed in the bottom of a DSC pan, after which they are heated at 10 K min$^{-1}$ from 25 to 265° C.

Advantageously a layer thickness of the inner barrier layer is in a range of 0.001 mm to 0.5 mm, preferably in a range of 0.005 mm to 0.1 mm. As previously described thinner layers of PEF in PET containers could be easier recycled and the color brightness of the PET container can be maintained. A typical bottle has 0.2-0.3 mm wall thickness, thinner bottles may have a wall thickness of 0.1 mm. Thus a barrier layer thickness of 0.001 mm, or 1% of the wall in a thinner bottle is realized. In thicker bottles of 0.5 mm wall thickness with 20% PEF barrier layer the PEF layer can be up to 0.1 mm. For thermoforming containers a range of 0.005-0.5 mm is preferred, corresponding to a wall thickness of 0.1-1 mm with 5-50% PEF barrier layer.

In a further embodiment the poly(ethylene furanoate) has a content of diethylene glycol below 2 wt %, based on the poly(ethylene furanoate). Such a low content of diethylene glycol is favorable as it enhances the crystallization process. The formation of diethylene glycol is for example suppressed by adding a DEG suppressant, modifying the esterification process or using a continuous polymerization process. A suitable method for the preparation of PEF with a low DEG content comprises a process, wherein a starting mixture comprising 2,5-furandicarboxylic acid and ethylene glycol or comprising a dialkyl ester of 2,5-furandicarboxylic acid and ethylene glycol is subjected to esterification or transesterifiaction to form an ester composition, which ester composition thus obtained is subjected to polycondensation at reduced pressure in the presence of a polycondensation catalyst to obtain a polycondensate, wherein the esterification or transesterification takes place in the presence of a basic compound and/or an ammonium compound capable of suppressing the formation of diethylene glycol. Suitable compounds include tetraalkyl ammonium compounds, choline, alkali metal salts of carboxylic acids, alkaline earth metal salts of carboxylic acids, basic alkali metal salts of mineral acids, basic alkaline earth metal salts of mineral acids, alkali metal hydroxides, ammonium hydroxides and combinations thereof. A suitable method has been described in WO 2015/137805.

Although it is preferred that no diacid moieties, other than 2,5-furandicrboxylate and optionally some other aromatic diacids, are present in the composition, it is acceptable for small amounts of acids or anhydrides with functionality of three or more, used as branching agents, for example at a level of 0.15 mol % or less. Such agents can actually improve the level of crystallinity when used to create a branched architecture and a resultant increase in strain hardening.

The addition of diols during the polymerization process, other than ethylene glycol, is generally disadvantageous, due to a reduction on the extent of crystallization of the PEF resin layer. Thus, preferably, the only added diol is ethylene glycol.

Although it is preferred that no diol moieties other than the ethylene glycol moiety are in the composition, it is possible to add low levels, for example less than 0.15 mol %, of moieties with three or more hydroxy units, such as pentaerthyritol or others, which may be added as branching agents. Such agents can actually improve the level of crystallinity when used to create a branched architecture and a resultant increase in strain hardening.

Having a PEF layer with an intrinsic viscosity (IV) which is higher than the viscosity of the PET layers lead to further enhancement of crystallization during the bottle blowing process. In one embodiment the IV of the PEF portion of the preform is preferably at least 0.03 dL/g higher, and more preferably at least 0.05 dL/g higher, and most preferably 0.07 dL/g higher than the PET layer(s). Advantageously, the IV of the PEF portion is at most 3.5 dL/g, more preferably at most 0.25 dL/g, higher than the IV of the PET portion. The intrinsic viscosity is conveniently measured for PET using 60/40 w/w phenol/tetrachloroethane at 25° C., following ASTM D4603. The IV of the PEF layer is measured using the same method. The IV is determined on the preform. As an alternative, e.g., if the preform is not available the IVs of the bottle can also be used, as relatively little drop in IV is experienced during the bottle blowing process.

As an example of this principle, if the PET portion of the preform has an IV of 0.79 dL/g, then the IV of the PEF layer is preferably at least 0.82 dL/g, more preferably at least 0.84 dL/g, and most preferably at least 0.86 dL/g.

The container comprises in some embodiments an additional inner layer defining an interior surface and comprising poly(ethylene terephthalate), wherein the inner barrier layer is arranged between the outer layer and the inner layer. Alternatively the inner barrier layer itself defines the interior surface.

In some embodiments the container is a bottle.

According to a second aspect the invention relates to a preform comprising an outer layer defining an exterior surface and comprising poly(ethylene terephthalate) and an inner barrier layer comprising semi-crystalline poly(ethylene furanoate). Such preform is also known as a pre-nucleated preform. The poly(ethylene furanoate) in the preform suitably has a crystallinity $X_c$ of at least 2%, preferably in the range of 3 to 10%.

The semi-crystalline or pre-nucleated poly(ethylene furanoate) in the preform can be achieved, e.g., by preparing the polymer with a nucleating agent. This infers the presence of crystalline nuclei in the poly(ethylene furanoate). This allows for some crystallinity of the polymer in the preparation of the preform from a melt. The preform production process may also be modified by manipulating cooling times and increasing mold temperature, such as the temperature of the mold in contact with the poly(ethylene furanoate), in order to induce more crystallinity in the preform. These steps may be done in a process which is separate from the normal injection molding or blow molding processes.

Another method is obtained by flow-induced crystallization. Flow of molten polymer is known to induce crystallization, which is referred to as flow-induced crystallization. Such is explained in, e.g., US 2009/163666.

In a further embodiment the preform comprises an additional inner layer defining an interior surface and comprising poly(ethylene terephthalate), wherein the inner barrier layer is arranged between the outer layer and the additional inner layer, and is achieved by simultaneous co-injection of both materials.

It is preferred that the preform comprises poly(ethylene furanoate) with a content of diethylene glycol of at most 2 wt %, based on the poly(ethylene furanoate).

According to a third aspect the invention relates to a method of making a container comprising
   providing a preform according to the second aspect of the invention, and
   stretch blow-molding the preform to a container.

The preform according to the second aspect of the invention and the method according to the third aspect share the advantages described in the context of the container according to the first aspect.

It shall be understood that the container of the first aspect of the invention and the preform according to the second aspect of the invention have similar or identical embodiments.

It is preferred that the stretch blow-molding comprises a relaxation step. Such a relaxation step enhances the crystallization of PEF and thus leads to improved containers as described in the context of the first aspect of the invention.

The relaxation step is in some embodiments performed with a mold temperature of at least 15° C., preferably at least 30° C. and/or a hold time of at least is, preferably at least 2 s in the mold. Both the temperature and the holding time may vary widely. The upper temperature is suitably 90° C., preferably 75° C. The holding time may be up to 15 min, preferably up to 10 min. It is further advantageous, if the relaxation step is performed in a mold of a material with a thermal conductivity below 5 W/(m*K), preferably of a non-metal material. This allows for a low cooling rate during the relaxation step and thus further enhances the crystallization. In some embodiments providing the preform comprises a polymerization process of a resin, wherein 10 to 10,000 ppm (mole/mole) of at least one of terephthalic acid, isophthalic acid or other aromatic diacids and/or at least one crystal nucleating agent is added. These measures enhance the crystallization of PEF during the production process.

The addition of acids during the polymerization process, other than 2,5-furandicarboxylic acid, also is generally disadvantageous due to a reduced extent of crystallization. The addition of certain aromatic diacids is acceptable at levels of 10 to 10,000 ppm (mol/mol). These aromatic acids are preferably selected from the group comprising terephthalic acid, isophthalic acid, naphthalene dicarboxylic acid, or combinations thereof. These acids have surprisingly been found have the ability to increase the crystallinity of PEF resins. Preferably, no other diacid moieties are added to the composition.

Nucleating agents may be added to the poly(alkylene furandicarboxylate) to increase the nucleation density, and thereby increase the overall crystallization rate under quiescent conditions. The nucleating agents may act as seeding particles to promote crystallization. The nucleating agents may suitably be selected from the group consisting of inorganic compounds, organic salts, organic acids, high melting waxes, polymers and combinations thereof. The high melting waxes suitably have a melting point in the range of 50 to 150° C. High melting waxes include materials such as stearamides and erucamides, or bis-amides.

When the nucleating agent comprises a polymer such polymer suitably is crystalline or semi-crystalline. Suitable polymers include the group consisting of PET, PBT, PEG, poly(ethylene-co-methacrylic acid), poly(ethylene-co-acrylic acid) and combinations thereof. Poly(ethylene-co-methacrylic acid) and poly(ethylene-co-acrylic acid) are so-called ionomers. Some ionomers are commercially available, e g. Surlyn ionomers from Du Pont, or Aculyn ionomers from Dow or Aclyn ionomers from Honeywell.

When the nucleating agent comprises an inorganic compound the inorganic compound is preferably selected from the group consisting of talc, titanium dioxide, silica, boron nitride, metal carbonate, clays, metal silicates and combinations thereof. The metal carbonate may comprise an alkali metal or an alkaline earth metal. Hence, the carbonate can be sodium or potassium carbonate, or calcium carbonate. It is also possible to use salts with other metals, such as zinc carbonate. The metal silicates may be selected from alkali metal silicates, such as sodium silicate, and alkaline earth metal silicate, such as calcium or magnesium silicate. Very suitably the silicates used are clays or zeolites, such as sepiolite (magnesium silicate clay), mordenite (aluminum-silicate containing alkali metal, alkaline earth metal and/or hydrogen ions). Other natural silicates may also be employed, such as mica. Silica may also be used. When silica is used in the nucleating agent, the silica may be natural crystalline silica such as sand or quartz or amorphous fused silica. The silica or silicates may be selected from naturally occurring minerals (e.g. sepiolite, mica, quartz), but also from synthetic silica or silicates (e.g. fused silica, synthetic zeolites).

When the nucleating agent comprises an organic compound, the compound may be an organic acid. In such a case, the nucleating agent preferably comprises an organic acid, selected from the group consisting of aromatic carboxylic acids, heteroaromatic carboxylic acids, saturated heterocyclic carboxylic acids, unsaturated heterocyclic carboxylic acids, hydroxyl group-containing mono- and diacids having from 4 to 12 carbon atoms, and combinations thereof.

Examples of an aromatic acid include benzoic acid, furoic acid, 2,5-furandicarboxylic acid, pyrimidine carboxylic acid (also known as orotic acid), pyridine carboxylic acid, tetrahydroxy hexanedioic acid (also known as mucic acid). Preferably, the nucleating agent comprises an organic salt. Such an organic salt suitably comprises a metal anion and an organic cation. The metal anion is suitably an alkali metal ion or an alkaline earth metal ion. Examples are the sodium, potassium, calcium and magnesium ions. The cation may be derived from a wide range of organic compounds, which typically include an acid functionality. The acid functionality may be provided by any of the acids that are mentioned above as suitable organic acid included as such in the nucleating agent. The nucleating agent preferably comprises an organic salt of the group selected from a metal salt of an aliphatic $C_8$-$C_{30}$-carboxylic acid, an optionally substituted aromatic acid, an optionally substituted aromatic diacid, an optionally substituted cycloaliphatic dicarboxylic acid and combinations thereof.

When these acids are substituted, the substituent may suitably be a $C_1$-$C_6$ alkyl group, a $C_1$-$C_6$ alkoxy group, a hydroxyl group, a halogen atom, a nitro group, sulfonyl-containing moieties or any combination thereof. Suitable aliphatic acids include stearic acid, oleic acid, lauric acid and montanic acid. Suitable aromatic acids include benzoic acid, phthalic acid, isophthalic acid, terephthalic acid, naphthalene carboxylic acid, naphthalene acetic acid and any combination thereof. Examples of suitable heterocyclic acids include furoic acid, furandicarboxylic acid.

In addition, other nucleating agents may be included in the nucleating agent in the masterbatch composition according to the present invention. Such additional nucleating agents are e.g. aromatic phosphonates, sulfonic acid ester salts of isophthalic acid, bis(4-10 propylbenzylidene) propyl sorbitol and 3.4-dimethylbenzylidene sorbitol phosphate salts and esters, available as NA-11, methylene-bis(4,6-di-t-butylphenyl)phosphate sodium salt, or NA-21, aluminium-hydroxy-bis[2,2"-methylene-bis(4,6-di-t-butyl-phenyl)-phosphate.

The most preferred organic compounds are saccharin (i.e. 2H-1$\lambda^6$,2-benzothiazol-1,1,3-trione), and the metal salts of saccharin. The nucleating agent therefore preferably includes saccharin or a salt of saccharin, wherein the salt may be selected from alkali and alkaline earth metal salt. Suitable examples are the sodium salt of saccharin and the calcium salt of saccharin. It has been found that the use of the metal salts of saccharin provides excellent crystallization results.

Preferably providing a preform comprises providing a resin of poly(ethylene furanoate) and of poly(ethylene terephthalate) and injection molding the resins to provide a preform. Two separate parts can be injection molded that form a single preform, or PET can be injection molded in a mold cavity containing a molded PEF article, in a process called overmolding. Alternatively, PEF and PET can be co-injected into a preform in a single step.

EXAMPLES

In table 2 and 3 examples of 250 ml bottles and the improvement in shelf life due to semi-crystalline PEF as barrier layer instead of a pure PET bottle or a PET bottle with Nylon MXD6 barrier layer are shown.

The shelf life test is carried out as a calculation similar to the one described for PET bottles in M. Profaizer, Italian Food and Beverage Technology, 48 (2007) 1-6.

The crystallinity $X_c$ was determined using a Mettler-Toledo DSC 1 equipped with the STAR software, calibrated using In and Zn standard. For this, the barrier layer was carefully removed from the bottle side-wall panel where the bottle diameter is the largest, and circles with a 5 mm radius were cut therefrom and placed in the bottom of a DSC pan, after which they were heated at 10 K min$^{-1}$ from 25 to 265° C.

The crystallinity $X_c$ is calculated from the integrated DSC peaks via the following equation:

$$\text{Crystallinity } X_c = \frac{\Delta H_{melt(net)}}{\Delta H^O_{melt}} \qquad \text{(Equation I)}$$

with $\Delta H_{melt}$ (net) being the net melting enthalpy measured at the first upheat of the sample and $\Delta H°_{melt}$ the equilibrium melting enthalpy taken at 140 J g$^{-1}$ for PEF.

TABLE 2

| | Shelf life | | | | |
|---|---|---|---|---|---|
| Example | 1 | 2 | 3 | 4 | 5 |
| Volume (mL) | 250 | 250 | 250 | 250 | 250 |
| Weight (g) | 21.0 | 21.0 | 21.0 | 21.0 | 21.0 |
| Main material | PET | PET | PET | PET | PET |
| Barrier material | — | Nylon MXD6 | PEF | Nylon MXD6 | PEF |
| Barrier layer (% w/w) | — | 5 | 10 | 5 | 10 |
| Blow mold temperature (° C.) | 15 | 15 | 15 | 70 | 70 |
| Barrier layer crystallinity (%) | — | 26 | 7 | 29 | 24 |
| Shelf life to -17.5% loss, starting from 4.2 Vol. (wks) | 10 | 25 | 18 | 27 | 26 |

TABLE 3

| | Shelf life | | | | | |
|---|---|---|---|---|---|---|
| Example | 6 | 7 | 8 | 9 | 10 | 11 |
| Volume (mL) | 250 | 250 | 250 | 250 | 250 | 250 |
| Weight (g) | 25.0 | 15.0 | 15.0 | 15.0 | 15.0 | 15.0 |
| Main material | PET | PET | PET | PET | PET | PET |
| Barrier material | — | Nylon MXD6 | PEF | Nylon MXD6 | PEF | — |
| Barrier layer (% w/w) | — | 5 | 10 | 5 | 10 | — |
| Blow mold temperature (° C.) | 15 | 15 | 15 | 70 | 70 | 15 |
| Barrier layer crystallinity (%) | — | 28 | 9 | 30 | 28 | — |
| Shelf life to -17.5% loss, starting from 4.2 Vol. (wks) | 12 | 12 | 9 | 13 | 13 | 7 |

As can be seen from tables 2 and 3 the shelf life of an all-PET bottle increases with at least 7% for every weight percent of PEF added as a barrier layer. Furthermore, the shelf life of an all-PET bottle is increased with between 9% and 10% for every weight percent of PEF added as a barrier layer, when the bottle is subjected to a relaxation step, like using a hot mold or non-metal mold material. On the other side, while maintaining the same shelf life, the total weight of an all-PET bottle can be reduce by more than 2% for every weight percent of PEF added as a barrier layer. And while maintaining the same shelf life, the total weight of an all-PET bottle can be reduced by between 3% and 5% for every weight percent of PEF added, when the bottle is subjected to a relaxation step.

The invention claimed is:

1. A container comprising an outer layer defining an exterior surface and comprising poly(ethylene terephthalate) and an inner barrier layer comprising semi-crystalline poly(ethylene furanoate) wherein the poly(ethylene furanoate) has a crystallinity $X_c$ of 15 to 40%.

2. The container according to claim 1, wherein the inner barrier layer comprising poly(ethylene furanoate) has an intrinsic viscosity which is higher than the intrinsic viscosity of at least the outer layer.

3. The container according to claim 1, wherein a layer thickness of the inner barrier layer is in a range of 0.005 mm to 0.1 mm.

4. The container according to claim 1, wherein the poly(ethylene furanoate) has a content of diethylene glycol of at most 2 wt %, based on the poly(ethylene furanoate).

5. The container according to claim 1 comprising an additional inner layer defining an interior surface and comprising poly(ethylene terephthalate), wherein the inner barrier layer is arranged between the outer layer and the additional inner layer.

6. The container according claim 1, wherein the container is a bottle.

7. The container according to claim 1, wherein the inner barrier layer comprising poly(ethylene furanoate) has an intrinsic viscosity which is at least 0.03 dL/g higher than the intrinsic viscosity of at least the outer layer.

8. The container according to claim 7, wherein the inner barrier layer comprising poly(ethylene furanoate) has an intrinsic viscosity which is at least 0.05 dL/g higher than the intrinsic viscosity of at least the outer layer.

9. The container according to claim 8, wherein the inner barrier layer comprising poly(ethylene furanoate) has an intrinsic viscosity which is at least 0.07 dL/g higher than the intrinsic viscosity of at least the outer layer.

* * * * *